United States Patent [19]

Flanigan et al.

[11] Patent Number: 4,844,817

[45] Date of Patent: Jul. 4, 1989

[54] LOW PRESSURE HYDROCYCLONE SEPARATOR

[75] Inventors: David A. Flanigan; Elwyn Shimoda; James E. Stolhand, all of Ponca City, Okla.

[73] Assignee: Conoco Inc., Ponca City, Okla.

[21] Appl. No.: 213,196

[22] Filed: Jun. 29, 1988

[51] Int. Cl.$^4$ .......................................... B01D 17/038
[52] U.S. Cl. ................................... 210/788; 210/805; 210/808; 210/144; 210/512.1
[58] Field of Search ............... 210/767, 787, 788, 800, 210/801, 803, 804, 805, 806, 808, 194, 195.1, 195.3, 195.4, 196, 197, 512.1; 209/144, 211

[56] References Cited

U.S. PATENT DOCUMENTS

| | | | |
|---|---|---|---|
| 2,322,018 | 6/1943 | Huber | 73/202 |
| 2,726,548 | 12/1955 | Van Der List | 73/422 |
| 2,981,413 | 4/1961 | Fitch | 209/211 |
| 3,557,956 | 1/1971 | Braun et al. | 210/84 |
| 3,638,498 | 2/1972 | Nelms | 73/422 TC |
| 3,661,528 | 5/1972 | Falk | 23/254 R |
| 3,707,869 | 1/1973 | Raynor | 73/28 |
| 3,780,567 | 12/1973 | Ovard | 73/28 |
| 3,842,678 | 10/1974 | De Baun et al. | 73/421.5 A |
| 3,930,414 | 1/1976 | Russell | 73/422 R |
| 4,094,794 | 6/1978 | Kahmann | 210/512 R |
| 4,413,533 | 11/1983 | Diesel | 73/863.31 |
| 4,414,112 | 11/1983 | Simpson et al. | 210/512.1 |
| 4,622,132 | 11/1986 | Chupka | 209/211 |

OTHER PUBLICATIONS

Colman et al., "Hydrocyclones For Oil/Water Separation", Paper Presented at International Conference on Hydrocyclones Held Oct 1-3, 1980, at Churchill College, Cambridge, United Kingdom.

Meldrum, "Hydrocyclones: A Solution to Produced Water Treatment", paper OTC 5594 Presented at the Offshore Technology Conference in Houston, Tex., Apr. 27-30, 1987.

Exhibit A-Brochure entitled "Allweiler AG Bottrop Works".

Exhibit B-Brochure entitled "Vortoil® Hydrocyclone" of Conoco Specialty Products, Inc.

*Primary Examiner*—Frank Sever

[57] ABSTRACT

A system is provided for the separation of oil from oily water, particularly where the oily water is available only at relatively low pressures insufficient to drive a hydrocyclone separator. Particular combinations of pumps and hydrocyclones can be effective in these low pressure situations where the pressure boost required is not substantially greater than a differential pressure at which the pump begins to substantially degrade the volumetric mean size of droplets of oil in the oily water passing therethrough. This is achieved by operating the pump at relatively near its maximum flow rate capacity to substantially reduce on a percentage basis the effect of fluid slippage within the pump. Improved techniques for analysis of oil droplet size distribution are also disclosed.

31 Claims, 8 Drawing Sheets

LOW PRESSURE HYDROCYCLONE SEPARATOR

BACKGROUND OF THE INVENTION

1. Field Of The Invention

The present invention relates generally to the separation of liquid-liquid mixtures, and more particularly but not by way of limitation to the separation of oil from oily water produced at an oil well production site.

2. Description Of The Prior Art

In a typical oil well production operation, the amount of produced water increases as the field matures. In some operations, the bulk of the volume of produced fluids may be water. Although there is no direct economic incentive, recent tightening of government regulations in various parts of the world regarding the amount of oil in discharged waters has increased interest in improving and optimizing oily water separators.

This problem is particularly acute on offshore production platforms. Size and weight limitations on separation equipment limit the available options. Furthermore, on floating offshore platforms, the movement of the platform may affect the performance of some traditional types of separating equipment.

The most traditional scheme utilized for cleanup of oily water on offshore production platforms includes a weir type primary separator which allows the oily water to stand for a period of time such that free oil can accumulate at the top thereof and pass over a weir, with the cleaner stream then being drawn off from the primary separator and directed to a flotation type secondary separator. The flotation type secondary separator is very large, on the order of the size of a large room, and is motion sensitive. A level control valve is disposed between the primary and secondary separators and is operably associated with a level sensing device in the primary separator to account for varying input flow and to maintain the appropriate fluid level in the primary separator for operation of the weir.

As offshore fields mature and the volume of water production becomes greater and greater, traditional systems like that just described become less and less practical. Furthermore, the motion sensitive nature of the secondary separators utilized are particularly unsuitable to floating platforms such as tension leg platform designs which have come into use in recent years.

More recently, the use of hydrocyclone separators as a substitute for the flotation type secondary separator has been proposed. Early work on the design of hydrocyclones suitable for separating entrained oil droplets from oily water is found in a paper of Colman et al., entitled "Hydrocyclones for Oil/Water Separation" presented at the International Conference on Hydrocyclones, held Oct. 1-3, 1980, at Churchill College, Cambridge, UK. In addition to discussing suitable designs for such hydrocyclones, Colman et al. discloses with reference to FIG. 3 thereof an isokinetic sampling technique for sampling a flowing stream of oily water and analyzing the droplet size distribution therein. The sampling technique of Colman et al. was limited in that it was purely a laboratory system operating at low pressures. It was not operable over a wide range of flow rates, and it sampled the flowing stream at only a single position on its cross section.

Subsequent work taking this hydrocyclone technology into the field and actually using it to clean up oily water on an offshore production platform is reported in a paper by Meldrum, entitled "Hydrocyclones: A Solution to Produced Water Treatment", Paper No. OTC 5594 presented at the 19th Annual Offshore Technology Conference in Houston, Tex., on Apr. 27-30, 1987.

Meldrum reported the successful application of hydrocyclone separators in a situation in the Murchison field where the oily water was available from the primary or first stage separator at a pressure sufficient to drive the hydrocyclones. The hydrocyclones in Meldrum's application were installed immediately downstream of the primary or first stage separator, but upstream of the separator level control valves.

Meldrum also reported on a second application of this hydrocyclone technology to an offshore tension leg platform in the Hutton field where the oily water was available at a significantly lower initial pressure. The pressure was sufficient, however, to provide relatively satisfactory performance of the hydrocyclones, although the results were less successful than had been achieved in the Murchison field where the oily water was available at higher pressures.

As part of the work reported by Meldrum on the Hutton field where low pressure of the oily water provided less than optimum conditions for use of the hydrocyclones, Meldrum reported on tests utilizing pumps to boost the pressure of the oily water before directing it to the hydrocyclones. Meldrum's combination of pumps and hydrocyclones was unsuccessful in satisfactorily cleaning up the oily water. Meldrum recognized that the basic problem was at least in part that the pumps and other equipment upstream of the hydrocyclone were breaking up the oil droplets into smaller sizes which were more difficult for the hydrocyclone to separate.

The pump utilized by Meldrum in his tests was a Moyno two-stage progressive cavity pump, of the type which is described below in the specification of this application as a "large progressive cavity pump". Meldrum apparently was operating this pump at a relatively low percentage of its flow capacity. Although Meldrum had not discovered a successful combination of pump and hydrocyclone for oily water treatment, he did hypothesize that such a combination could be achieved, and suggested with regard to the pump that it was desirable to achieve increased pump discharge pressures "without increasing speed of rotation" of the pump. This was in line with traditional theories of "low shear" pumps which involved the use of oversized pumps turning at relatively low speeds and thus operating at a relatively low percentage of their maximum capacity in order to minimize "shear" of the fluids being pump.

Thus, the prior art recognized the need for a pump and hydrocyclone combination capable of cleaning low pressure oily water.

SUMMARY OF THE INVENTION

The present invention provides a pump and hydrocyclone oily water separation system which can successfully clean oily water to the standards required by present day regulations (e.g., to less than 40 ppm of oil in the discharged water from the hydrocyclone) even when the oily water is available only at very low pressures.

This has been accomplished by the development of improved oil droplet distribution analysis techniques, and the subsequent use of those techniques to analyze various pumping equipment to determine what pumping equipment can be successfully utilized in combination with a hydrocyclone separator.

Most surprisingly, we have discovered that traditional concepts of "low shear" pumps, wherein the pump is oversized and then rotated at relatively low speed, are generally unsatisfactory for pumping of oily water, and in fact are counterproductive. We have discovered that in fact the most desirable pumping system for use with a hydrocyclone is one which is operated at or near its maximum flow capacity, just contrary to what was expected from conventional wisdom.

We have determined that the most desirable pumping systems are those which have a relatively low slippage, and which are operated relatively near their maximum flow rate capacity.

The most desirable pumping system has been determined to be a progressive cavity pump having an equal wall stator. This pump is capable of providing the necessary flow rates, at high differential pressures on the order of 130 psi with substantially no slippage and thus with minor oil droplet size degradation.

Other pumps have been determined to also be suitable for certain applications where lesser differential pressures are required. We have determined that there are a number of possibly suitable candidate pumps, each of which has an associated differential pressure at which that pump begins to substantially degrade the volumetric mean size of oil droplets passing therethrough.

In any particular pump and hydrocyclone application, such as for example on an offshore production platform, the necessary differential pressure which must be generated by the pump is the difference between the available oily water pressure, and the pressure desired to adequately drive the hydrocyclone. By choosing a pump which can provide this necessary pressure increase without substantially degrading the volumetric mean size of the oil droplets contained in the pump fluid, and then operating that pump at relatively near its maximum flow rate capacity to substantially reduce on a percentage basis the effect of fluid slippage within the pump, a suitable pump and hydrocyclone combination is provided which can effectively clean the low pressure oily water.

Numerous objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

General Description Of The Invention

Figure 1:
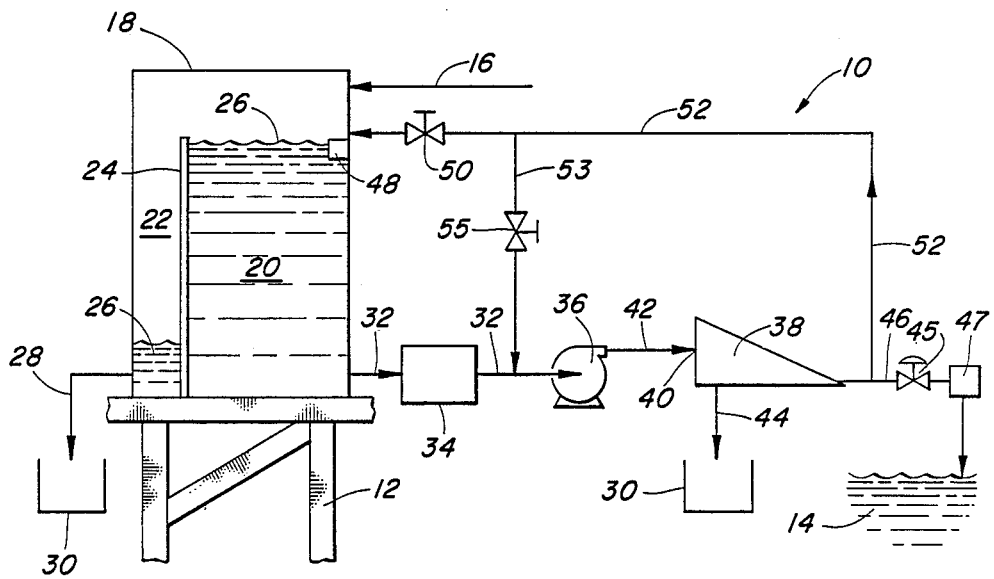
FIG. 1 is a schematic illustration of a pump and hydrocyclone system installed downstream of a primary separator of an oil well production system and having an oil droplet distribution sampling apparatus installed upstream of the pump.

Referring now to FIG. 1, an oily water separation system generally designated by the numeral 10 is there schematically illustrated. The entire system 10 is mounted upon an offshore production platform 12 located above a body of water 14.

Oily water may generally be described as a liquid-liquid mixture containing a dispersed phase liquid, the oil, and a bulk phase liquid, the water. It should be understood by those skilled in the art that the present invention is also effective with liquid-liquid mixtures where oil constitutes the bulk phase and water the dispersed phase, i.e., dewatering hydrocyclones. The present invention is effective in either system, although for brevity it is described in terms of an oil-in-water separation system.

As will be appreciated by those skilled in the art, the production platform 12 supports a large collection of equipment for producing, treating, storing, and discharging petroleum produced from subsea wells. As part of this production process, a great deal of water is produced with the oil. Due to environmental considerations, this produced water must be cleaned up so that substantially all of the oil is removed therefrom before the produced water can be discharged back into the sea 14 or injected back into subsea wells. For example, discharge water cleanliness standards may require that there be no more than forty (40) ppm of oil in the water discharged back into the sea.

This produced oily water resulting from the production process is directed by conduit 16 to a primary or first stage weir type separator 18.

The primary separator 18 is divided into two sections 20 and 22 by a dividing wall or weir 24.

The oily water introduced by conduit 16 collects in first section 20 and resides there for sufficient time that the free oil contained therein can to a very large extent collect near the upper surface 26 and flow over the top of weir 24 into the second section 22 where the free oil 26, which will also include a small amount of water, can then be directed through conduit 28 to an oil storage means 30 or other suitable location.

Oily water which is substantially cleaner than that introduced through conduit 16, but which still contains a substantial amount of oil is drawn from primary separator 20 through conduit 32 to a pump means 36.

Preferably, the oily water is first passed through a sampler apparatus 34, disposed in conduit 32, which can be used to analyze the oil droplet size distribution in the oily water in a manner described in detail below.

The oily water directed to pump means 36 through conduit 32 can generally be described as a supply of oily water at a first pressure.

Downstream of the pump means 36 there is a hydrocyclone means 38 for separating most of the remaining oil from the oily water. The hydrocyclone means is one specifically designed for separation of oil from oily water in a manner like that described for example in Colman, et al., "Hydrocyclones for Oil/Water Separation", a paper presented at the International Conference on Hydrocyclones, Oct. 1-3, 1980, and Meldrum, "Hydrocyclone: A Solution to Produced Water Treatment", Paper OTC 5594 presented at the Offshore Technology Conference in Houston, Tex., on Apr. 27-30, 1987, both of which papers are incorporated herein by reference.

Suitable hydrocyclone means 38 are presently being commercially distributed under the trademark Vortoil ® which are available from BWN Industries, Danedong, Victoria, Australia.

For any given application, the hydrocyclone means 38 chosen will have a minimum input pressure required for operation of the hydrocyclone, and an optimum input pressure at which the hydrocyclone operates most efficiently. For the given application, there will be a desired input pressure which is equal to or greater than the minimum input pressure.

The pump means 36 must be suitably chosen to provide a means for increasing the pressure of the oily water from the mentioned first pressure in conduit 32 to a second pressure which is the desired pressure at an inlet 40 of hydrocyclone means 38 while substantially minimizing oil droplet size degradation and maintaining an oil droplet size distribution capable of being efficiently separated in the hydrocyclone separator means 38.

A pump can be chosen for one of two purposes. The oily water may be available at such a low pressure that the use of a pump is absolutely necessary before a hydrocyclone separator can be used. Also, a pump may be used in situations where the oily water is at a pressure sufficient to drive the hydrocyclone, but increases in efficiency if separation can be obtained by increasing the pressure of the oily water provided to the hydrocyclone.

The oily water is directed from the pump means 36 through a discharge conduit 42 to the hydrocyclone means 38.

In the hydrocyclone means 38, most of the remaining oil is separated from the oily water, and this oil plus a small amount of water is directed as a reject stream through a reject conduit 44 to the aforementioned oil storage or other suitable means 30. The remaining water, having only relatively minute amounts of oil remaining therein is discharged from the hydrocyclone means 38 in a clean water discharge stream directed through a clean water discharge conduit 46 to optional polishing tank 47. A back pressure control valve 45 is disposed in discharge conduit 46. The clean water is discharged from polishing tank 47 to the sea 14.

Operation of the primary separator 18 requires that the upper level 26 thereof be maintained slightly above the top of weir 24, as will be well understood by those skilled in the art. A level sensing mechanism 48 is installed within the separator 18 and is operably associated with a level control valve 50 disposed in a recycle flow conduit 52 which takes a portion of the clean water discharge from hydrocyclone means 38 and directs it back to the primary separator 18 for maintaining the fluid level in first section 20 thereof.

If recycle is also necessary for controlling the flow rate of the pump means 36, this recycle should also be directed from the clean water discharge stream through a pump recycle conduit 53 in which is disposed pump recycle control valve 55.

The relatively fine oil particles contained in the clean water discharge from the hydrocyclone will of course be further degraded as they pass through the control valves 50 or 53, but when that fluid is passed a second time through the hydrocyclone 38, a considerable portion of these finer drops, perhaps as much as 40% or 50% would be expected to be removed, thus somewhat making up for the degradational effects of the recycle control valves. Of course, the oil contained in the clean water discharge stream is at such a low concentration that it will be relatively negligible in any event.

The details of construction and use of the various components of the system 10 which has just been generally described are set forth below.

Sampling And Analysis Of Oil Droplet Size Distributions

Prior to the present invention very little was known about oil droplet size distributions in oily water production streams because of the difficulty of making these droplet size measurements. Although some initial work had been done on measurement of oil droplet size distributions as reported by Colman et al., in their paper entitled "Hydrocyclones for Oil/Water Separation" presented at the Oct. 1-3, 1980, International Conference on Hydrocyclones held at Churchill College, Cambridge, UK, the work of Colman, et al., utilized only laboratory type equipment which operated at low pressures at ideal laboratory conditions, and which was not in any manner suitable for use in the field.

In order to test the capabilities of various pumps to pump oily water without excessively breaking up the oil droplets, it was first necessary to develop equipment and techniques which could be utilized to make oil droplet size distribution analyses in field situations.

This equipment has been generally indicated in the system shown in FIG. 1 as the sampler apparatus 34.

Figures 2A, 3:
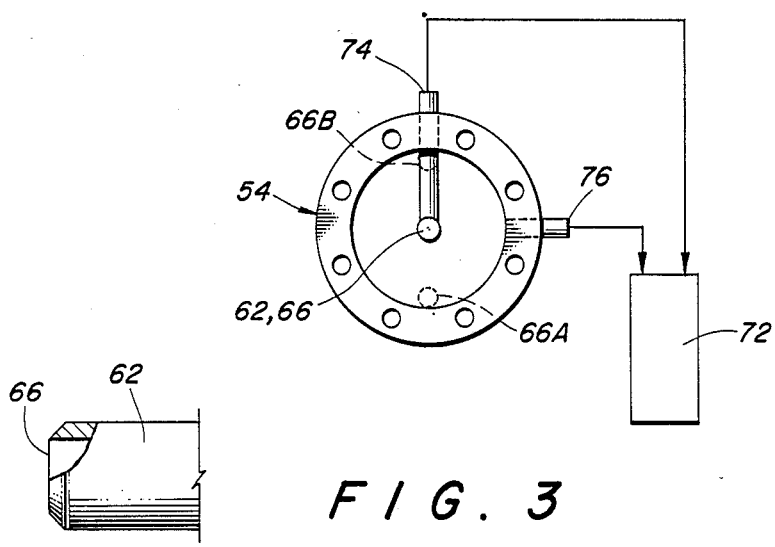
FIG. 2A is an enlarged view of the leading edge of the Pitot tube of the apparatus of FIG. 2.
FIG. 3 is a left end view of the apparatus of FIG. 2.
Figure 2:
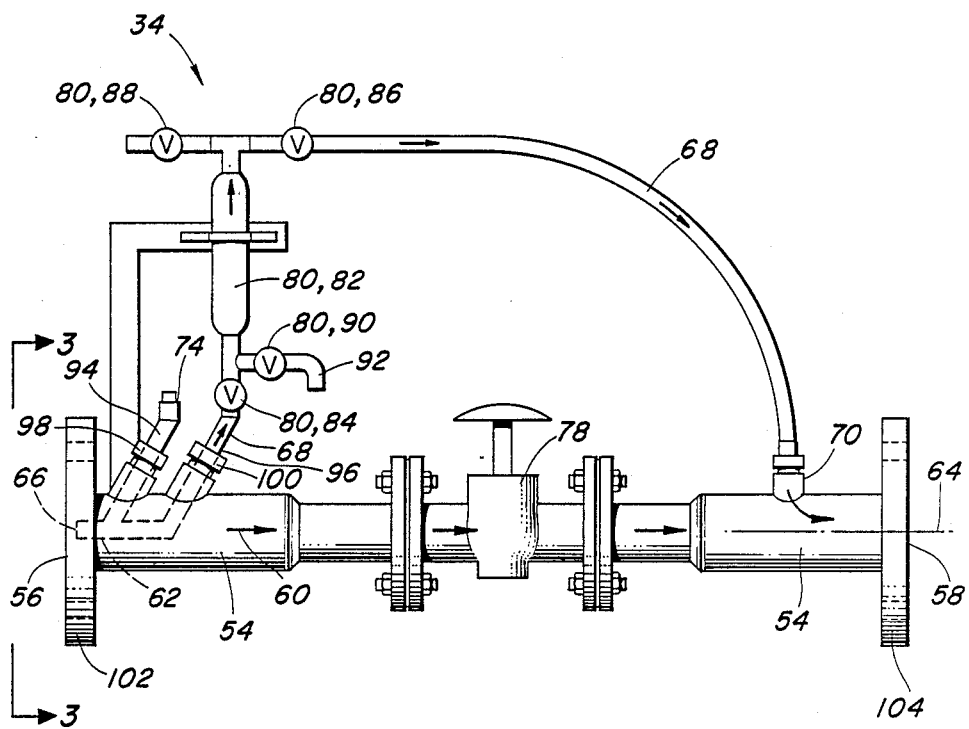
FIG. 2 is an elevation somewhat schematic illustration of a sampler apparatus.

The sampler apparatus 34 is illustrated in detail in FIGS. 2 and 3.

As is described below, we have utilized the sampler apparatus 34 to test various pumps and pump and hydrocyclone combinations to determine what pumps are suitable and under what conditions they are suitable for pumping low pressure oily water to a hydrocyclone.

As illustrated in FIG. 1, it is also useful and contemplated by the present invention that such sampler apparatus 34 may be permanently located in the oily water separation system 10 for continuously or periodically monitoring the oil droplet size distribution as a means for sensing changes in the system due to changes in incoming produced fluids, equipment malfunctions, and the like.

It will be further apparent that the sampler apparatus 34 can be utilized to test many other types of equipment where the distribution of droplet sizes of a suspended liquid is critical. For example, sampler apparatus 34 might be used to optimize a coalescer system.

Turning now to FIG. 2, the sampler apparatus 34 includes a primary flow conduit 54 having an inlet 56 and an outlet 58 defining a direction 60 of fluid flow therethrough from the inlet 56 to the outlet 58.

A Pitot tube 62 is disposed in the primary flow conduit 54 and aligned substantially parallel to a longitudinal axis 64 of the primary flow conduit 54. The Pitot tube 62 has an open end and leading edge 66 facing into said direction 60 of fluid flow through the primary flow conduit 54.

The leading edge 66 of Pitot tube 62 is preferably sharpened as seen in FIG. 2A such that the fluid smoothly enters the tube thus minimizing or substantially reducing turbulence and droplet shear.

A sample flow conduit 68 extends from the Pitot tube 62 to a junction 70 with primary flow conduit 54 downstream of the Pitot tube 62.

As best seen in FIG. 3, which is a left end view of FIG. 2, a differential pressure measuring means 72 is provided for comparing a fluid pressure within the Pitot tube 62 as sensed at outlet 74 with a fluid pressure in primary flow conduit 54 near the open end 66 of Pitot tube 62 as sensed at outlet 76 defined in primary flow conduit 54.

The differential pressure measuring means 72 may either be a manometer or an inches-of-water differential pressure measuring device, or other suitable instrument.

Sampler apparatus 34 further includes a flow restriction means 78 disposed in primary flow conduit 74 between the Pitot tube 62 and junction 70, for creating a pressure drop sufficient to flow a sample stream of fluid through the sample flow conduit 68. The flow restriction means 78 is preferably a low shear type of valve which provides a variable restriction so that the restriction can be adjusted to provide a suitable pressure drop across valve 78 over a wide range of fluid flow rates through the primary flow conduit 54. This capability is important when the apparatus 34 is utilized on a production system where the flow rate of produced oily water from a well will vary for any number of reasons. The system must be designed to operate at various expected flow rates.

Suitable valves 78 would include relatively low shear valves of the type which can generally be described as having a non-tortuous path with a minimum of sharp edges or turns. Examples of suitable valves include plug valves and weir type valves having rubber linings. Suitable valves should not have greater than a two psi pressure drop thereacross at the required flow rates through primary flow conduit 54. Typical examples of valves having tortuous paths which should not be used would include needle valves, globe valves and gate valves.

The advantage of having a valve 78 providing an adjustable restriction in the primary flow conduit 54 is that it allows the sampler apparatus 34 to be adjusted to provide a pressure drop suitable to cause the sample stream to flow through sample flow conduit 68 over a wide range of fluid flow rates through the primary flow conduit 54.

In order to avoid excessive shearing and accompanying oil droplet size degradation in the valve 78, the valve 78 should be chosen and sized so that there is no more than a two psi pressure drop thereacross at flow rates within the range of flow rates expected to be encountered in primary flow conduit 54.

Typically, about a one psi pressure drop will be sufficient to direct the sample stream through sample flow conduit 68, if the various components of the apparatus 34 are properly chosen and sized.

A sampler means 80 is disposed in the sample flow conduit 68 for defining a sample of the sample stream to be analyzed. In the embodiment illustrated in FIG. 2, the sampler means 80 includes a sample chamber 82 and sample valves 84 and 86 disposed in the sample flow conduit 68 upstream and downstream, respectively, of sample chamber 82 for trapping a sample in the sample chamber 82.

The sampler means 80 illustrated also includes a pressure relief valve 88 and a sample drain valve 90.

The sampler apparatus 34 provides a means for taking an isokinetic sample, that is one which is representative of and has the same kinetic energy as the fluid stream flowing through primary flow conduit 54.

The sampler apparatus 34 shown in FIG. 2 affords the capability of sampling fluids in a pressurized flowing system without affecting the physical properties of the sample.

In the sampler apparatus 34, the valve 78 is utilized to create a restriction in the flow stream in primary flow conduit 54. As mentioned, under normal flow conditions, the restriction created by valve 78 needs to create a pressure drop of less than two psi, and preferably no more than one psi to cause the sample stream to flow through sample flow conduit 68.

To take a sample, valves 88 and 90, which are typically ball valves, are closed. Valve 84, which is preferably a ball valve, is open. The flow rate through the sample flow conduit 68 is then set with the regulating valve 86.

Regulating valve 86 is adjusted until the differential pressure measuring means 72 senses equal pressures in Pitot tube 62 and in the primary flow conduit 74 at outlet 76, which corresponds to equal flow velocities of the sample stream in Pitot tube 62 and the primary stream in primary flow conduit 54. When adjustments are correct, cross-sectional flow of the Pitot tube 62 is directed into the Pitot tube 62 and into the sample chamber 82 at the same velocity as the fluid stream in primary flow conduit 54 which is being sampled.

The fluid sample flows through the sample cylinder 82, the regulating valve 86, and sample flow conduit 68 back to the main flowing stream 54 at junction 70.

The primary flow conduit 54, Pitot tube 62, sample flow conduit 68 and flow restriction means 78 are so arranged and constructed that a flow rate of the sample stream is no greater than about one percent of the flow rate through primary flow conduit 54. This minimizes any negative effect of the sample apparatus 34 on the droplet size distribution in primary flow conduit 54. In order to determine whether the sampler 34 itself created any significant degradational effect on the oil droplets passing therethrough, two samplers such as the sampler 34 were put in series and detected no measurable change in samples due to the upstream sampler.

To trap and remove a fluid sample, valves 86 and 84 are closed to trap the sample. Valve 88 is then opened to vent the pressure, and the sample is removed by draining it from sample cylinder 82 through valve 90 by gravity flow.

The fluid sample is directed through outlet conduit 92 into a beaker (not shown) in which it is collected. The sample can then be transferred from the beaker to a suitable droplet size distribution analysis instrument. One instrument suitable for this analysis, which was utilized in the various tests described below, is that marketed as a Coulter Counter Model TAII, available from Coulter Electronics, Ltd., of Northwell Drive, Luton, Beds., LU3 3RH England.

The Coulter Counter Model TAII is actually a particle size analyzer, but tests have shown it to be capable of producing reasonably accurate results in measuring liquid droplet sizes.

The Coulter Counter Model TAII determines the number and sizes of droplets suspended in a conductive liquid. The suspension is forced to flow through a small aperture and the electrical current passing through the aperture is monitored. The series of pulses are classified by size and counted in as many as sixteen different channels.

In the tests described below, the Coulter Counter Model TAII was calibrated using latex spheres and a synthetic brine of approximately the same ionic strength as the produced water at the test location. A 100 micron aperture was used to measure droplets in the size range from 1.5 to 64 microns.

For actual measurements, five ml. of sample fluid were diluted approximately thirty to one with synthetic brine. The droplet size measurements were made within a minute of sampling. Later tests showed, if more than one minute is needed, immediate dilution and gentle stirring of the sample could keep its integrity for over five minutes. The raw data and results generated by the Coulter Counter Model TAII were then stored electronically using a data acquisition system. An analysis of the oil concentration in the water using solvent extraction and an infrared analyzer was done for each droplet size measurement.

The Pitot tube 62 is illustrated in FIGS. 2 and 3 in a position substantially coaxial with the central longitudinal axis 64 of primary flow conduit 54. The Pitot tube 62 is, however, constructed so that it is radially movable within the primary flow conduit 54 so that samples may be taken at various positions across a cross section of the primary flow conduit 54.

This feature is provided by the two parallel legs 94 and 96 which extend from Pitot tube 62 through two parallel fittings 98 and 100, respectively, extending through the side wall of primary flow conduit 54.

The legs 94 and 96 are slidably disposed through fittings 98 and 100 so that the open end 66 of Pitot tube 62 can be moved from a location 66A shown in phantom lines in FIG. 3 adjacent the bottom of primary flow conduit 54 to a location 66B shown in phantom lines in FIG. 3 adjacent the top of primary flow conduit 54.

The provision of this means for radially moving the Pitot tube 62 is particularly important in a primary flow conduit which is oriented generally horizontally as is the primary flow conduit 54 illustrated in FIG. 2.

It will be appreciated that for some oily water mixtures under certain conditions the oily water mixture may tend to segregate within the pipeline upstream of the sampler apparatus 34. If that occurs, it will then be necessary to take samples across a diameter of the primary flow conduit 54, and to integrate the measured data by an appropriate mathematical technique in order to accurately determine the oil droplet size distribution for the entire volume of fluid flowing through a cross section of the primary flow conduit 54.

In the testing described below, the data was all taken with the Pitot tube 62 located at a fixed position generally coaxial with the primary flow conduit 54. This was a result, however, only of the fact that the fluids tested were found not to be substantially segregated. It is certainly conceivable that other test conditions could provide a situation where it is necessary to test the sample over a range of positions across the cross section of the primary flow conduit 54. The movability of the Pitot tube 62 is particularly important in a horizontally oriented sampler wherein there is much more likely to be a segregation of the fluid across the cross section of the sampler than would be the case if the primary flow conduit 54 were oriented generally vertically.

As illustrated in FIG. 2, the primary flow conduit 54 of sampler apparatus 34 is in that embodiments constructed as a removable pipe spool 54 having pipe flanges 102 and 104 at its inlet and outlet ends. This construction allows the sampler apparatus 34 to be removably located at a plurality of locations within the various piping defining the oily water stream in the system 10 shown in FIG. 1. Although FIG. 1 illustrates the sampler apparatus 34 located in conduit 32 between the primary separator 18 and pump means 36, the system 10 can easily be designed so as to have a removable spool piece in pump discharge conduit 42 so that the sampler apparatus 34 may be placed in the pump discharge conduit 42.

Determination Of Effect Of Various Pumps On Oil Droplet Size Distributions

The sampler apparatus 34 described above was utilized to test a number of types of pumps and pump and hydrocyclone combinations to determine what combinations of equipment could suitably clean oily water to the levels required for discharge from an offshore production platform like the system described above with regard to FIG. 1.

Figure 4:
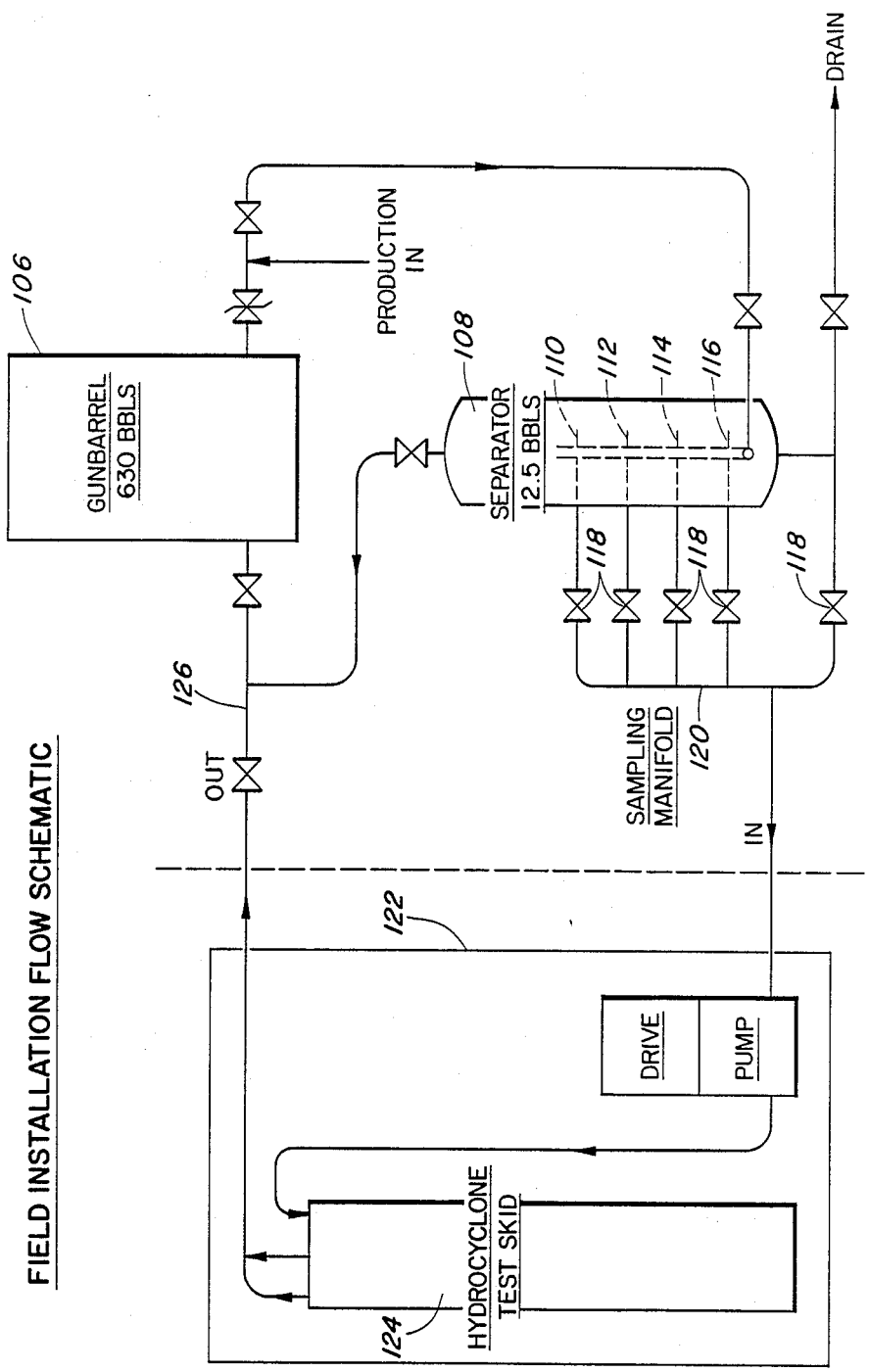
FIG. 4 is a schematic illustration of the field test facility utilized to conduct the tests reported herein.

FIG. 4 is a schematic diagram of the field installation in which the various pumping and hydrocyclone equipment was tested. The once-through oily water test circuit is constructed by diverting flow from the gun barrel 106. The flow is directed to a specially designed free oil separator 108. Free oil and gas break out quickly in separator 108 and flow out the top of the separator 108.

Oily water for testing is taken from the free oil separator 108 by one of four collectors 110, 112, 114 and 116 or out the bottom of the separator 108. By using a combination of the valves 118 on a sampling manifold 120, the concentration and droplet sizes of oil in the oily water fed to the pump and hydrocyclone test unit 122 can be varied. Once the fluids have passed through the hydrocyclone 124, they are remixed and returned to the gun barrel 106 through a conduit 126.

The tests were conducted at the Edwards Central Tank Battery of the Oklahoma City Division of Conoco Inc., located at Geneseo, Ks. Initially, production from the Fuller Lease was utilized for the test. Total produced fluids for the Fuller Lease were approximately 2500 BPD. The test circuit was changed to operate with fluids from the Buehler Lease. Total produced fluids for the Buehler Lease were about 4400 BPD and provided enough oily water to test a 60 mm. Vortoil ® hydrocyclone unit.

Duplicate tests were run using fluids from both leases, and no detectable differences were seen in the results. The majority of results presented below were obtained with fluids from the Buehler Lease. Both leases were producing fluids from similar formations. The crude was about 36 to 37 API gravity. The produced water was close to a 2 percent brine solution. The temperature of the fluids at both leases was constant.

Temperature at the Fuller Lease averaged about 38° C., while the Buehler Lease averaged 47° C.

Oily water was sampled isokinetically with a sampler apparatus such as apparatus 34 described above with regard to FIG. 2, and droplet sizes were determined utilizing a Coulter Counter Model TAII again as described above.

The Coulter Counter Model TAII was calibrated using a synthetic brine of about the same ionic strength as the produced water. The same synthetic brine was used to dilute the sample by a factor of approximately 30. A 100 micron orifice was used to measure droplets in the size range from 2 to 64 microns. A data acquisition system was used to store the numerical data electronically.

Figure 5A:
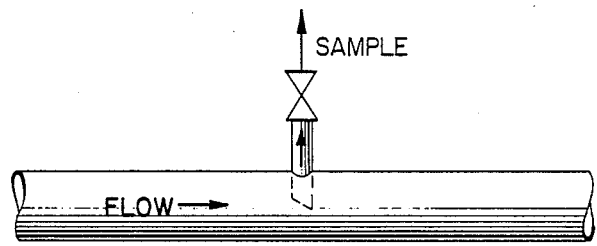
FIGS. 5A, 5B and 5C schematically illustrate three types of sampler devices that were considered.
Figure 5B:
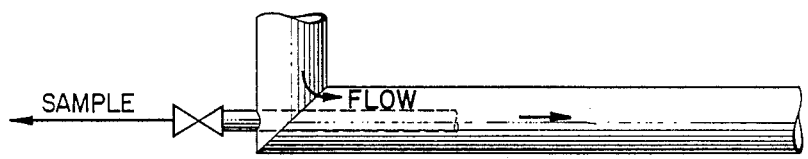
Figure 5C:
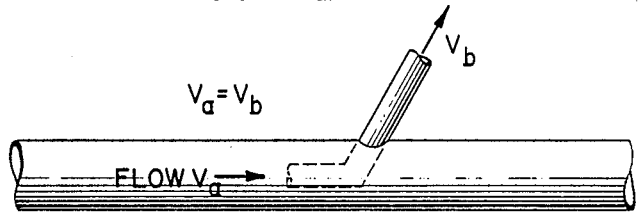

FIGS. 5A, 5B and 5C illustrate schematically three different types of samplers which were initially tested. Of the three samplers, only the isokinetic sampler shown in FIG. 5C yielded a sample representative of the actual oily water system, and thus the isokinetic sampler 34 as described in detail with regard to FIG. 2 was utilized for the subsequent pump testing.

Figure 6:
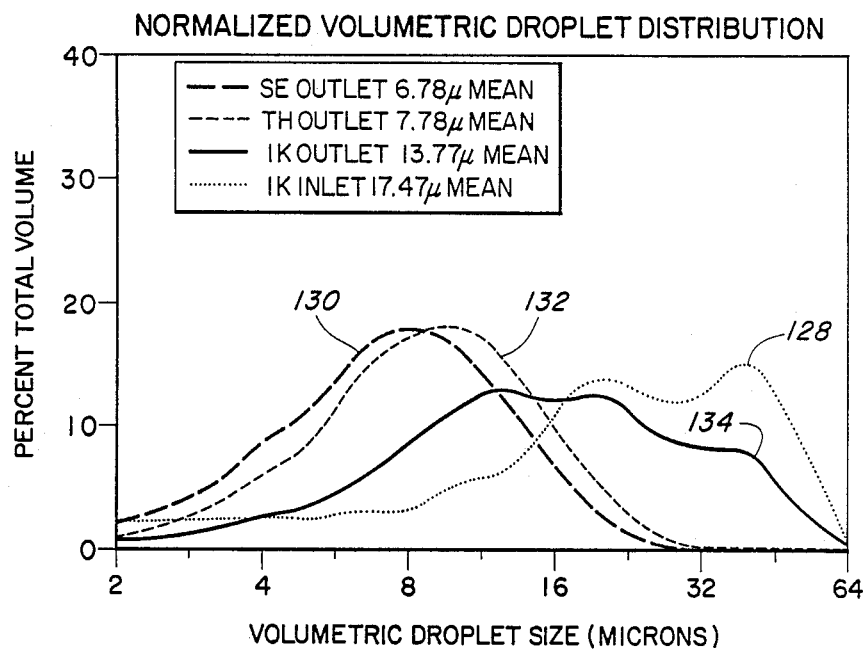
FIG. 6 graphically illustrates the operation of the three types of sampler apparatus.

FIG. 6 shows four droplet distributions, which are representative of the three types of samplers shown in FIGS. 5A–5C.

Curve 128 represents the droplet distribution sampled isokinetically at the inlet of a pump. Curves 130, 132 and 134 represent the droplet distributions measured at the outlet of the pump by the sharp edge sampler of FIG. 5A, the thief type sampler of FIG. 5B and the isokinetic sampler of FIG. 5C, respectively.

The isokinetically sampled droplet distribution at the pump inlet, shown by curve 128 shows the majority of the volume of oil is in sizes greater than 16 microns. The isokinetically sampled outlet drop distribution shown by curve 134 shows that the pump being tested sheared the larger droplets into smaller ones, and the average droplet size has changed from 17.47 microns to 13.77 microns as indicated in the box near the upper right corner of FIG. 6.

Droplet distributions measured using the sharp edge sampler of FIG. 5A represented by curve 130 and the thief sampler of FIG. 5B represented by curve 132 at the pump outlet indicate a very different droplet distribution than that represented by the isokinetic sample shown on curve 134. Once the pressure of the oily water being sampled was above 20 psig, all droplet distributions measured by the sharp edge type and thief type samplers of FIGS. 5A and 5B look the same, i.e., like the bell shaped curves 130 and 132 shown in FIG. 6. It was apparent that the sharp edge and thief type samples, which were taken across a valve directing the fluid into a beaker, do not provide representative measurements of the droplet sizes present in the flowing stream. Thus, it was determined that all sampling should be done using isokinetic samples such as those taken by sampler apparatus 34 like that shown in FIG. 2.

During the course of this testing, all droplet distributions were measured using an isokinetic sampler like that shown in FIG. 2. These results were consistent and indicated changes in oil droplet sizes resulting from changes in valves, pumps, strainers, chemicals, etc. The droplet sizes measured may not be exactly the same as in the primary flow conduit 54, but the results are precise enough to make good engineering decisions about the equipment tested.

The mean oil droplet sizes reported herein, such as shown in FIG. 6, are stated in terms of volumetric mean. The volumetric mean is defined as that diameter for which one-half the volume of the oil contained in the sample exists in droplets having a diameter less than the volumetric mean, and the other one-half the volume of the oil contained in the sample exists in droplets having a diameter greater than the stated volumetric mean.

Oil concentrations in the produced water were determined by carbon tetrachloride extraction and infrared analysis. Using normal field procedures, oil concentration measurements were accurate to within five percent for concentrations less than 80 to 90 ppm. For concentrations of oil from 90 to 200 ppm, the measurements were good to within eight percent. Oil concentration measurements from 200 to the highest concentration of 550 ppm had an average accuracy of about 12%.

Seven different pumps were tested. Table 1 below lists the seven pumps tested in order of their performance relative to droplet shearing, least shear to most shear.

TABLE 1

PUMPS TESTED

| Manufacturer | Type | Model | Maximum Flow Rate BPD | Maximum Pressure PSIG | Test RPM | Max. Test Capacity % |
| --- | --- | --- | --- | --- | --- | --- |
| 1. Allweiler | Progressive Cavity (with equal wall stator) | SHP 380.2 | 3450 | 348 | 122–512 | 100 |
| 2. Moyno | Progressive Cavity (small) | 2L6 | 1700 | 150 | 244–1024 | 100 |
| 3. Waukeshau | Twin Rotary Lobe | 125i | 4300 | 200 | 122–512 | 75 |
| 4. Blackmer | Sliding Rotary Vane | TX-2 | 1700 | 150 | 122–512 | 100 |
| 5. Moyno | Progressive Cavity (large) | 2F036G1 | 6000 | 175 | 122–512 | 50 |
| 6. Gould | Single Stage Centrifugal | 3196-ST | 2100 | 110 | 3600 | 100 |
| 7. Stothert & Pitt | Twin Screw | 111B | 3700 | 150 | 600–1100 | 93 |

Figure 7:
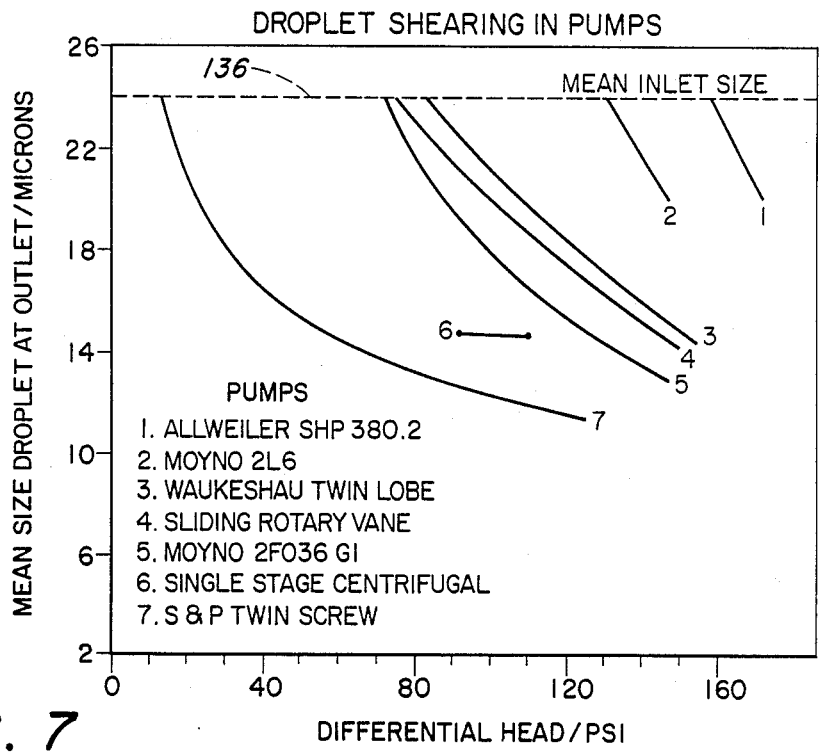
FIG. 7 graphically illustrates the performance of seven types of pumps which were tested.
Figure 8:
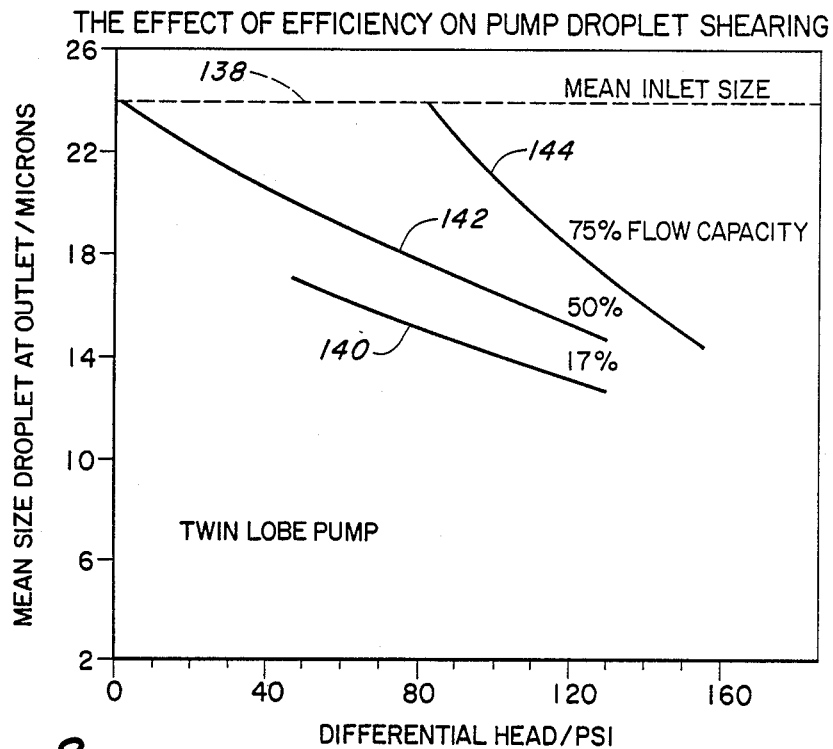
FIG. 8 graphically illustrates the effect on the efficiency of pump droplet shearing of increasing the percentage of maximum flow capacity at which the pump is operating.

The relative performance of each of the pumps tested can be determined from FIG. 7. In FIG. 7, the volumetric mean droplet size at the pump outlet is plotted as a function of differential head generated. The inlet volumetric mean droplet size, 24 microns, is plotted as the horizontal dashed line 136.

The curves in FIG. 7 are numbered 1, 2, 3, 4, 5, 6, and 7 corresponding to the numbered designations of the seven pumps which were tested as listed in the lower left corner of FIG. 7. The curves indicate the best performance which was achievable by each of the seven pumps in the tests which were conducted. It is noted that several of the pumps were not tested up to 100% capacity for various reasons, but the tests were run at a high enough capacity on those pumps to clearly indicate their place in the hierarchy of FIG. 7. The pumps are ranked in order. Pump 1, namely the Allweiler Model SHP 380.2, performed the best.

FIG. 7 can be utilized to determine which of the seven pumps tested are available options for a given required differential pressure which must be generated by the pump.

For example, if the design situation requires that the pump provide a 120 psi differential head, the data of FIG. 7 tells us that pumps 1 and 2 can provide this 120 psi differential head with no detectable degradation of the volumetric mean oil droplet size passing through the pump. Pumps 3, 4, 5 and 7, however, have reduced the oil droplet size at the pump outlet to sizes in the range from 18.5 to 11.5 microns.

FIG. 7 shows that where differential heads of less than about 75 psi are required, pumps 3, 4 and 5 may also be suitable candidates as they have no detectable degradation of volumetric mean oil droplet size at that differential pressure.

FIG. 7 shows that pump 1, the Allweiler progressive cavity pump with equal wall stator, was able to generate approximately 160 psi differential head without significant oil droplet degradation. Further, the pump exhibited little or no slip over most of the range tested, even when flow rates of less than 30% of capacity were used, at 160 psi differential head.

The equal wall stator in the Allweiler pumps provides a better sealing mechanism and reduces slip as compared to the common stator design utilized in pumps 2 and 5 where the stator is formed entirely of elastomer.

That common stator design provides good performance for smaller pumps, such as pump 2, the Moyno Model 2L6, but relatively poor performance for larger pumps, such as pump 5, the Moyno Model 2FO36G1.

FIG. 4 shows the relative performance of the various pumps tested at the optimum pump settings for each pump, i.e., that is at the flow rate at which the pump provided the largest volumetric mean droplet size distribution for the greatest differential head. This was generally at flow capacities near the maximum flow capacity of the pump.

This discovery, that in order to minimize degradation of oil droplet sizes, the pump should be run at or near its maximum flow capacity, is a very surprising one and is directly contrary to traditional thinking on low shear pumps. Traditional concepts of "low shear" pumps required that a pump be oversized and then run at a relatively low percentage of its flow capacity. We have discovered, however, that such techniques are counterproductive to the desired goal of the present invention, namely the provision of a pump which minimizes oil droplet size degradation on a volumetric percentage basis.

We have discovered that the degree of oil droplet size degradation is related to pump slip. The flow rate or output of any pump run at a constant speed is reduced as the outlet pressure is increased. Larger volumes of fluid "slip" back through the pump's internal seals as the outlet pressure is raised. Pump slip can be defined on a percentage basis as the percentage of fluid which slips back through the pump's internal seals at a given outlet pressure as a percentage of the flow rate of fluid which the pump can produce at that same pump speed at a zero outlet pressure.

We discovered that pump slip was relatively constant for a given outlet pressure regardless of the flow rate at which the pump was operating. Thus, to minimize the effect of this pump slippage, it is desirable to operate the pump at as high a capacity as possible so that the volume of fluid flowing through the pump undisturbed, essentially dilutes the effect of the relatively small volume of fluid which is slipping back through the pump.

This effect is illustrated in FIG. 8 wherein the volumetric mean droplet size at the outlet of pump No. 3, the twin lobe pump, is plotted as a function of differential head generated by the pump. The inlet volumetric mean droplet size, 24 microns, is again designated by a horizontal dashed line 138. The flow rates are labeled as a function of the pump's total capacity. Thus, curves 140, 142, and 144 correspond to the twin lobe pump operating at 17%, 50% and 75% of its maximum flow capacity, respectively.

The results shown in FIG. 8 illustrate the discovery that as the pump is operated nearer to its maximum flow capacity, the degradational effect of the pump on the volumetric mean oil droplet size passing therethrough is greatly decreased for a given differential head across the pump.

Although the results in FIG. 8 are only for tests on the twin lobe pump, it was determined that the same principles generally apply for the other pumps tested. It should be noted that the progressive cavity pump with equal wall stator is somewhat of an exception. It has been found to have such a low background slippage that it can be effectively utilized at relatively low percentages of its maximum flow capacity since the slippage is still negligible compared to the volumetric throughput of the pump even at those lower portions of its capacity. This is the exception, however, rather than the rule. Furthermore, the operation of a progressive cavity pump with equal wall stator at very low flow rates would not, however, be a practically acceptable solution to a given pumping problem because of the economic waste involved. For many pump designs such as the twin lobe pump and the sliding rotary vane pump, and for the larger progressive cavity designs the internal slippage will typically be such that the pump can only be effectively utilized when operated relatively near its maximum operating capacity as indicated in FIG. 8.

As mentioned, the volume of fluid which slips back in a pump is determined by the outlet pressure. The oil droplets in this fluid which slips will be highly sheared and thus their size significantly reduced. The effect of this internal shearing of the pump, however, can be overcome if the volume of sheared material is negligible with respect to the total flow rate through the pump. Thus, for purposes of the present invention where it is desired to minimize the degradation of the volumetric mean oil droplet size, so as to provide a distribution of oil droplet sizes to the hydrocyclone downstream which can be effectively removed, it is desirable to operate the pump at as near as possible to its maximum flow capacity. Certainly, it is preferable with most pumps that the pump operate at at least something greater than 50% of its maximum capacity, and more preferably at 75% or greater.

Again, to illustrate and describe this effect with regard to FIG. 8, at a differential head of 120 psi, and a flow rate of about 17% capacity, the volumetric mean oil droplet size at the outlet of the twin lobe pump is about 13 microns. By increasing the flow rate to 50% capacity, a mean droplet size of about 15.5 microns is achieved. Further, if we operate the lobe pump at 75% of capacity, we can spread the sheared droplets over a great enough volume to achieve a mean droplet size of 18.5 microns at the outlet of the pump.

As mentioned, the data shown in FIG. 8 is typical for all pumps tested except the progressive cavity pump with equal wall stator. With all of these pumps represented by FIG. 8, there is a great improvement as the flow rate is increased from very low flow to 50% of capacity. There is still very significant improvement as flow is further increased from 50% to 75% of capacity. There is further improvement above 75% but it is less dramatic. Thus, the most preferred rate of pump operation is at 75% or greater of capacity. As discussed below, there sometimes will be other operational considerations, e.g., excessive wear due to particulate material in the fluid, that will mandate that the pump be run at less than 100% capacity.

Most pump vendors and manufacturers have traditionally oversized pumps to slow the rotational rate when low shear pumping is requested. FIG. 8 shows this method of pump application will be counterproductive to hydrocyclone operation by decreasing droplet sizes and thus decreasing hydrocyclone efficiency and performance. We have discovered that in fact for minimum damage to oil droplets, it is desirable that the pumps operate at near maximum capacity.

The relatively sharp break point where each of the curves 1–5 and 7 begins to descend from the 24 micron inlet size line is believed to be associated with the differential head at which the internal sealing mechanism of the pump begins to break down thus allowing substantial leakage or slippage of fluid back through the pump. It is also believed, however, that prior to reaching that differential head, there will be some relatively smaller amount of leakage or slippage in any pump which is dependent primarily upon the construction of the pump and the closeness of fit of the various components thereof. This leakage might be referred to as a background leakage or slippage.

As is apparent in FIG. 8, when a pump is operating at near its maximum flow capacity, the effect of this background slippage on a volumetric throughput percentage basis is so negligible that it cannot be measured by the droplet analysis techniques previously described. This is apparent in viewing the 75% flow capacity curve 144 in FIG. 8. At lower flow rates through the pump, however, the background slippage is apparently significant enough on a percentage of volume throughput basis that it is measurable at very low differential pressures as indicated in the curves 140 and 142 of FIG. 8.

Referring again to FIG. 7, the point at which each of the curves 1, 2, 3, 4, 5 and 7 begins to descend from the constant 24 micron mean inlet size line can generally be described as defining a differential pressure at which that pump begins to substantially degrade a volumetric mean size of the droplets of oil passing therethrough, when the pump is sized to operate relatively near its maximum flow rate capacity.

Although no absolute numerical limits can be stated to define all low slip pumps that would be suitable for use with hydrocyclones, a rule of thumb which can often be used is that when the pump is operating at the required discharge pressure for the hydrocyclone in question, the pump should have less than 10% slippage.

Utilizing data like that shown in FIG. 7, logical decisions can be made for suitable pump applications for use in a given hydrocyclone separating situation. Depending upon the differential pressure which must be generated, and the volumetric mean oil droplet size which can be efficiently separated by the hydrocyclone in question, data like that of FIG. 7 can be used to determine which pumps are capable of providing the required performance.

The data of FIG. 7 is of course related to the particular process conditions involved and the particular oily water mixture being pumped. The position of the curves would vary for different oily water mixtures under different process conditions, but similar results would be expected. For a given oily water mixture differing substantially from that utilized for the test of FIG. 7, it may be necessary to perform similar tests to determine the suitable working ranges of various pumps. Data like that of FIG. 7, however, may also be utilized on an intuitive basis to pick the most suitable type of pump and then the chosen pump and hydrocyclone combination could be tested to determine its effectiveness on the particular oily water conditions involved.

Of course, there are other factors which may be involved in determining which of the several pumps that might be indicated as suitable by FIG. 7 is in fact the best for a particular application.

Other variables which affect the suitability of given pumps include: (1) the effect of particulate materials on the pump (including required maintenance); (2) the physical size and weight of the pump; and (3) the economic cost of the pump and its installation.

For example, for the seven pumps discussed above, these three factors can generally be rated as shown in the following Table 2.

TABLE 2

Other Factors Affecting Suitable Pump Choices

| Manufacturer | Type | Model | Capacity To Handle Particulate Materials Without Excessive Maintenance | Physical Size | Cost Of Pump And Installation |
|---|---|---|---|---|---|
| 1. Allweiler | Progressive Cavity (with equal wall stator) | SHP 380.2 | Very good | Fair | High |
| 2. Moyno | Progressive Cavity (small) | 2L6 | Very good | Worst because of multiple installations | Highest |
| 3. Waukeshau | Twin Rotary Lobe | 125i | Poor-High Maintenance Required | Very good | Mid-Range |

TABLE 2-continued

Other Factors Affecting Suitable Pump Choices

| Manufacturer | Type | Model | Capacity To Handle Particulate Materials Without Excessive Maintenance | Physical Size | Cost Of Pump And Installation |
| --- | --- | --- | --- | --- | --- |
| 4. Blackmer | Sliding Rotary Vane | TX-2 | When Particulate Materials Involved Better than twin lobe, but still relatively high maintenance on vanes required when particulate materials involved | Very good | Cheapest |
| 5. Moyno | Progressive Cavity (large) | 2F036G1 | Very good | Worst, comparable to small progressive cavity | Highest |
| 6. Gould | Single Stage Centrifugal | 3196-ST | Very good | Poor due to multi-staging | Cheapest |
| 7. Stothert & Pitt | Twin Screw | 111B | Worst | Good | High |

Factors like those summarized in Table 2, are, of course, generally known to those skilled in the art, and can be used in conjunction with the information like that of FIG. 7 to choose the most appropriate pump for a given hydrocyclone application. Although the progressive cavity pump with equal wall stator has been determined by testing like that represented in FIG. 7 to be the very best choice of pump with regard to its effect on droplet shearing, there may be some installations where that pump is practically not the best choice because of space limitation on an offshore production platform or the excessive cost of that equipment compared to other equipment which may be cheaper or perhaps be already available.

For example, recent testing has determined that another pump not listed in the above tables, namely a piston type positive displacement pump has a very good performance comparable to that of the progressive cavity pump with equal wall stator with regard to its minimal droplet degradation effects. This is because this pump also has very low slippage. Plunger pumps also can handle fluids containing particulate materials relatively effectively. The disadvantages of a plunger pump are that it is very large and heavy, and also is a relatively high cost pump. One practical factor that may make it the pump of choice in certain situations, however, is that the plunger pump is already very commonly used in the oil field environment, and may in fact be readily available at a very low price as excess inventory. Thus, in those situations where the space is available, the plunger pump might be the pump of choice.

It further must be remembered that the choice of pump to be utilized in a given application must be matched to the hydrocyclones being utilized.

Typically, on an offshore production platform where the flow rate of oily water to be handled will vary over a significant range during the life of the installation and on a daily basis, there will be a plurality of hydrocyclones provided so that additional units can be brought on or taken off stream as the flow rate of water to be handled varies. Thus, each individual hydrocyclone when in operation will be operating at a flow rate near its maximum efficiency. The pumping system chosen for use with this battery of hydrocyclones must be similarly adaptable so that it too can handle the varying range of flow rates. Thus, one or more pumps will be chosen and arranged so that when each pump is brought on stream it will be operating relatively near its maximum flow rate, so as to minimize the droplet degradational effects of slippage on a volumetric throughput basis as previously described.

It must be remembered that the ability to operate the pumps at near their maximum capacity is also capable of being controlled by recycling a portion of the clean water discharged from the hydrocyclone back to the suction side of the pump so that a relatively steady pump rate can be maintained if necessary.

Also, since one of the critical factors in determining those pumps which can be utilized in a given situation is the differential pressure required by that pump, it should be recognized that some of the less suitable pump designs could in fact be staged so that multiple pumps are used with each pump providing only a portion of the overall differential pressure required, in order to achieve a system which can operate effectively and provide the necessary overall pressure boost without excessive oil droplet size degradation.

Furthermore, many of the factors related to pump choices may be interrelated. For example, if the fluid contains substantial particulate material, it may be necessary to slow down the pump in order to minimize stator wear. Then each candidate pump must be analyzed for the performance it can provide at the pump speed which is practical in the presence of this particulate material.

Examples of Successful And Non-Successful Pump-Hydrocyclone Combinations

We successfully identified a number of working hydrocyclone-pump combinations using droplet size analysis. In presenting these results, we will show working and poor hydrocyclone-pump combinations for both the 60 mm. and 35 mm. Vortoil ® hydrocyclone tubes. The hydrocyclone results will be related to pump performance for each case, using droplet size analysis. Hydrocyclone operation will be characterized in terms of the average feed droplet size, such that FIG. 7 can be used to estimate the efficiency and performance of the hydrocyclone-pump combinations tested.

Figure 9:
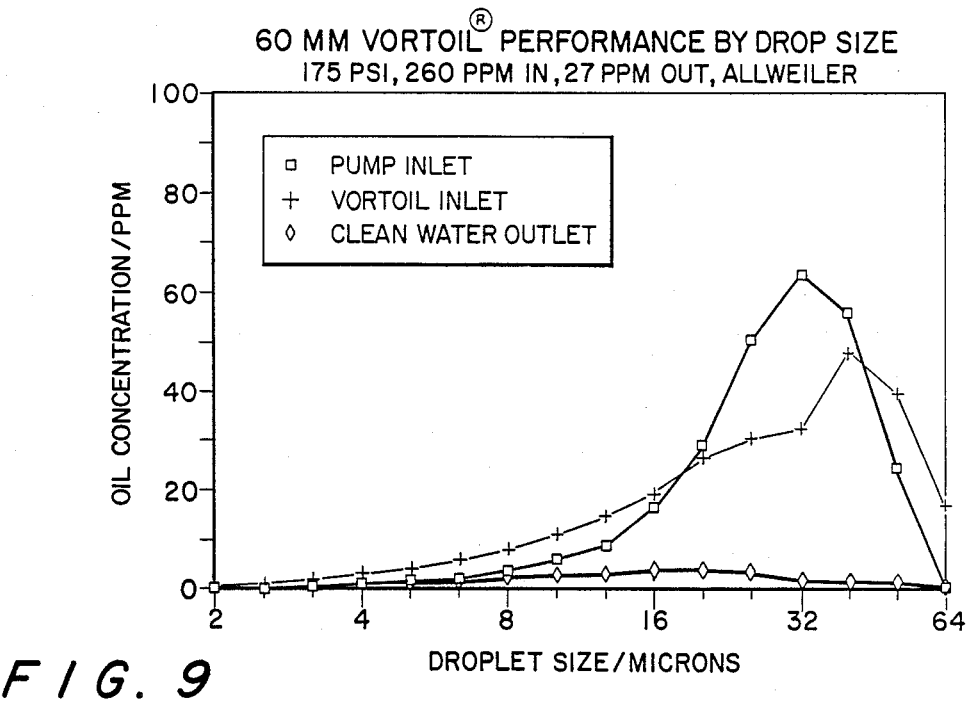
FIG. 9 graphically presents the results of a successful 60 mm. Vortoil ® hydrocyclone and pump combination.
Figure 10:
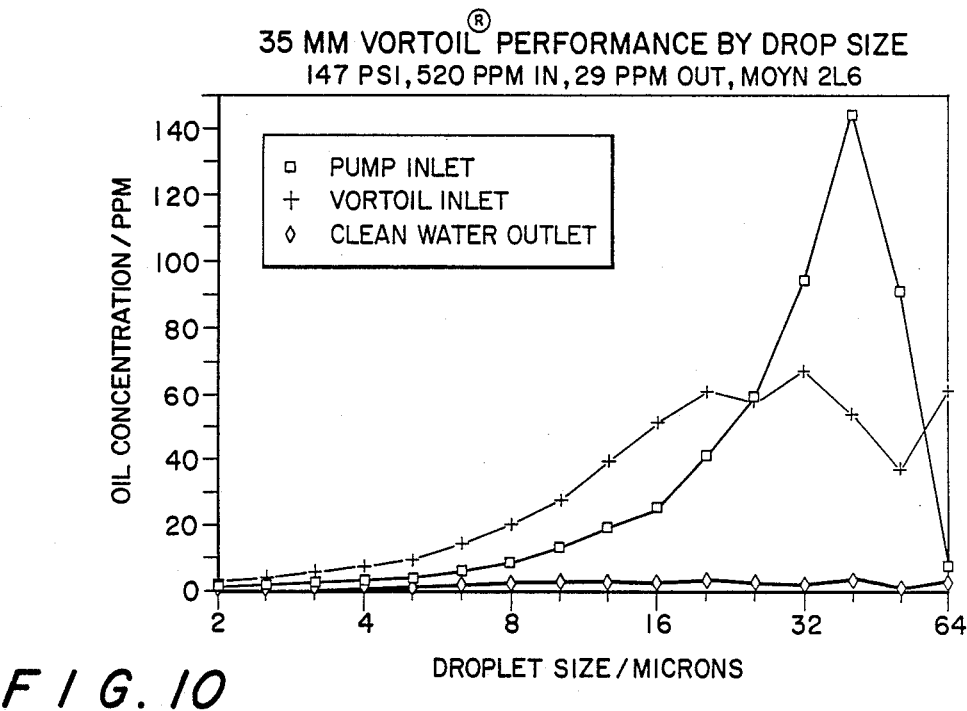
FIG. 10 graphically illustrates the performance of a o successful 35 mm. Vortoil ® hydrocyclone and pump combination.
Figure 12:
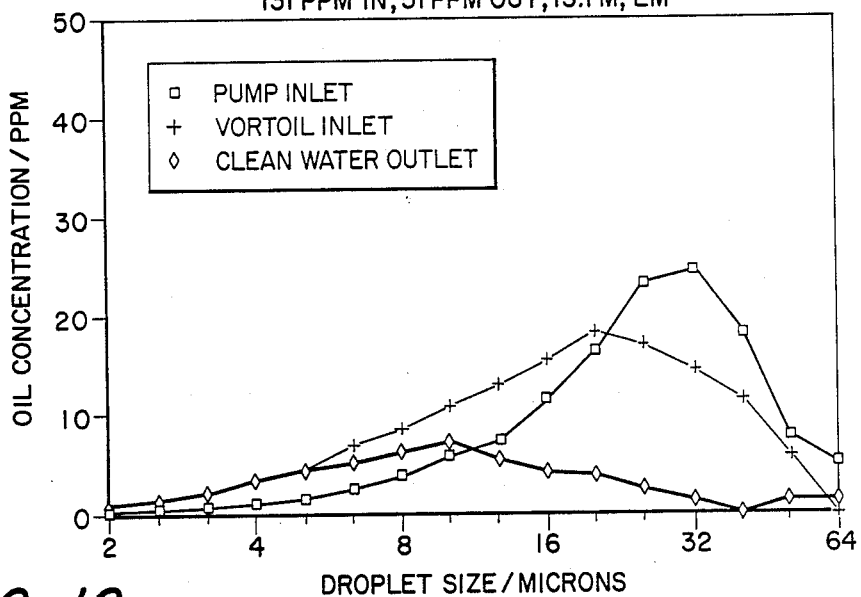
FIG. 12 graphically presents the performance of an unsatisfactory 35 mm. Vortoil ® hydrocyclone and pump combination.
Figure 11:
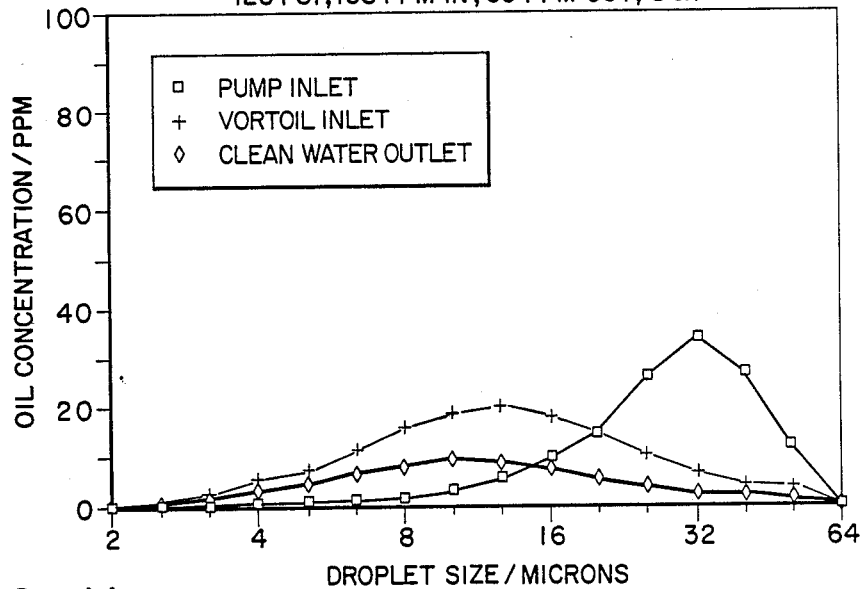
FIG. 11 graphically presents the results of an unsatisfactory 60 mm. Vortoil ® hydrocyclone and pump combination.

FIGS. 9, 10, 11 and 12 show the performance of four different pump-hydrocyclone combinations. In FIG. 9, pump 1, the Allweiler pump was utilized with a 60 mm. Vortoil ® hydrocyclone. FIG. 10 shows pump 2, the small progressive cavity Moyno pump, utilized in combination with a 35 mm. Vortoil ® hydrocyclone. FIG. 11 shows the performance of pump 7, the twin screw pump, in combination with a 60 mm. Vortoil ® hydrocyclone. FIG. 12 shows the performance of pump 5, the large progressive cavity pump in combination with a 35 mm. Vortoil ® hydrocyclone.

FIG. 9: A Satisfactory 60 mm. Vortoil ® Hydrocyclone-Pump Combination

To test the feasibility of the combination of pump 1, the Allweiler progressive cavity pump with an equal wall stator with a 60 mm. Vortoil ® hydrocyclone, a severe test was created. The pump was required to generate 175 psi of head by creating back pressure downstream of the hydrocyclone. Normally, only about 125 psi would be required for a throughput of 2850 BPD through the hydrocyclone. FIG. 9 shows that the Allweiler pump did minimal damage to the oil droplets and cleaned an oily water stream containing 260 ppm oil to a level of 27 ppm.

FIG. 9 shows that oil droplets of all sizes were present in the clean water stream. Most of the oil in droplet sizes greater than 16 microns has been removed. However, the hydrocyclone's ability to remove droplets below 16 microns quickly decreases with size. Although oil in droplet sizes less than 4 microns was retained and exited with the clean water stream, the 40 ppm discharge criteria was met because these small droplets amounted to an insignificant amount of oil on a volumetric throughput basis.

FIG. 10: A Working 35 mm. Vortoil ® Hydrocyclone-Pump Combination

FIG. 10 was selected to show a working 35 mm. Vortoil ® hydrocyclone-pump combination. FIG. 10 was also selected to show one of the tests conducted with a high hydrocyclone inlet oil concentration. In this test, oily water containing 520 ppm oil was cleaned to 29 ppm, yielding an efficiency of 94.5%.

FIG. 11: Poor 60 mm. Vortoil ® Hydrocyclone-Pump Operation

FIG. 11 shows the decline in performance of the hydrocyclone process when a pump shears too many of the droplets. In FIG. 11, notice that the bulk of oil is in droplet sizes smaller than 16 microns after passing through the Stothert & Pitt twin screw pump. The hydrocyclone cannot then remove enough of the small droplets to meet the 40 ppm criteria, as shown by the curve with the diamonds in FIG. 11.

FIG. 12: Poor 35 mm. Vortoil ® Hydrocyclone-Pump Operation

The purpose of FIGS. 11 and 12 is the illustrate conditions under which the hydrocylone units have trouble performing, not to illustrate the worst possible hydrocyclone performance. FIG. 12 was created with test data where the droplet distribution out of the pump was borderline for good hydrocyclone operation. Again, too many small droplets have been created by the pump for the hydrocyclone to meet the 40 ppm criteria. In this case, the pump used was the large Moyno, Model 2FO36Gl.

Figure 14:
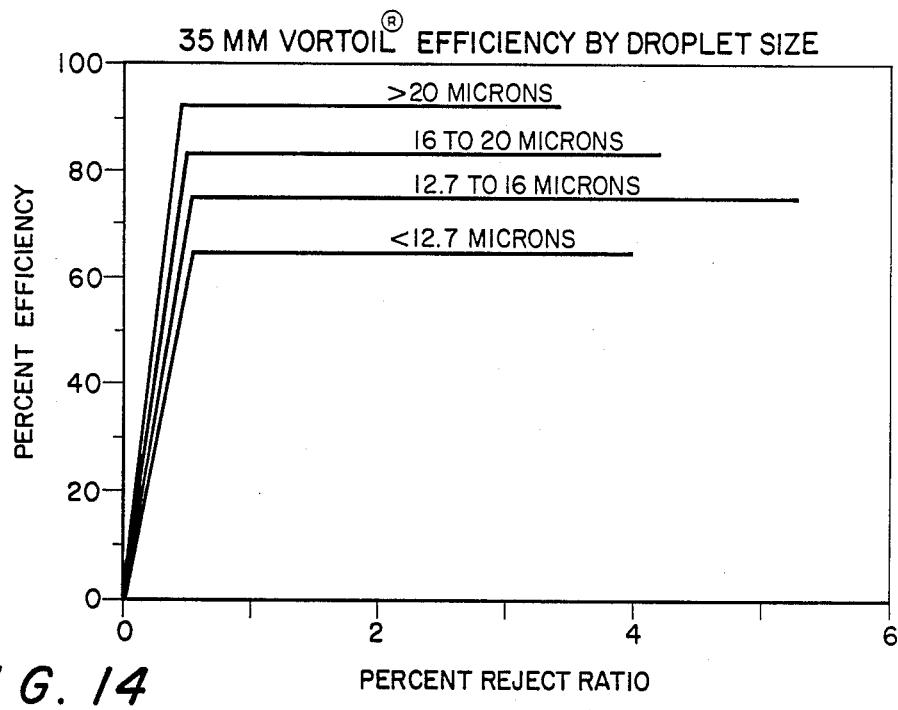
FIG. 14 graphically summarizes the efficiency of a 35 mm. Vortoil ® hydrocyclone by inlet droplet size.
Figure 13:
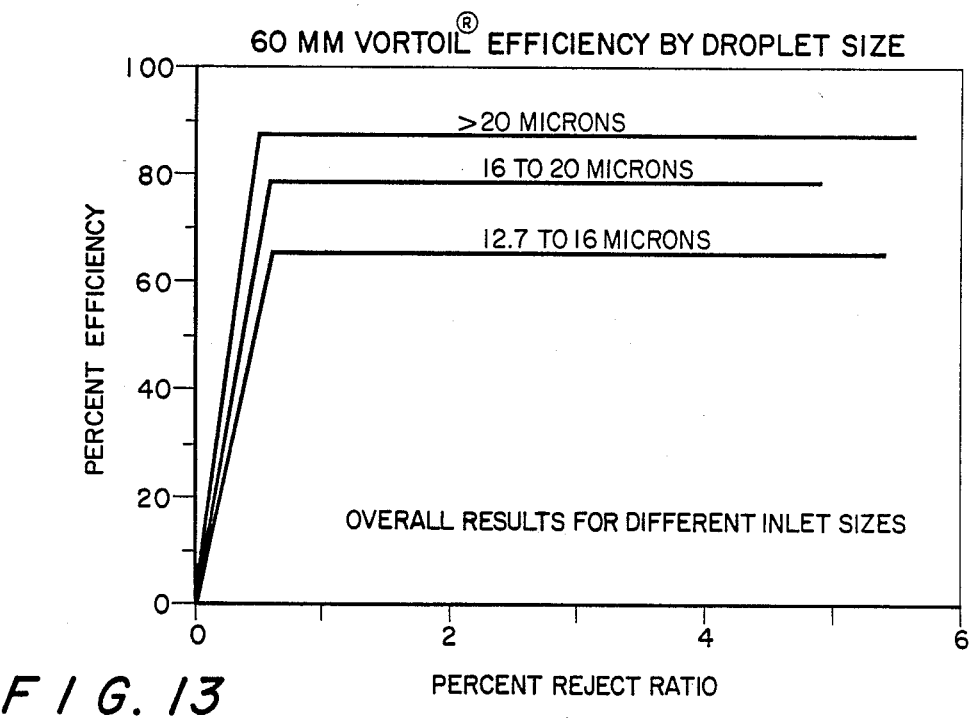
FIG. 13 graphically summarizes the efficiency of a 60 mm. Vortoil ® hydrocyclone by inlet droplet size.

FIGS. 13 and 14: Droplet Sizes And Vortoil ® Hydrocyclone Efficiency

In FIGS. 13 and 14, the expected changes in efficiency of the hydrocyclone with changing feed droplet sizes for both the 60 mm. and 35 mm. Vortoil ® hydrocyclones, respectively, are shown.

It is apparent from each of these figures that the efficiency of the hydrocyclone decreases as the volumetric mean droplet size decreases. Further, a comparison shows that the 35 mm. Vortoil ® hydrocyclone is more effective than the 60 mm. Vortoil ® hydrocyclone for the three size ranges which are comparable. Particularly, the 35 mm. Vortoil ® unit is more effective at removing smaller oil droplets than is the 60 mm. unit. The difference is most distinct in the droplet size range 12.7 to 16 microns. There the efficiency of the 35 mm. hydrocyclone unit averages greater than 10% more than the 60 mm. unit.

Estimating Low Pressure Hydrocyclone Capabilities

If the droplet size at a particular location is known, a first-hand estimate of the hydrocyclone capabilities and pump selections choices can be made using FIG. 7 in combination with FIGS. 13 and 14. For example, we can estimate the hydrocyclone efficiency from FIGS. 13 and 14. If one is fortunate enough to have droplets in the size range above 20 microns, we could select either the 35 mm. or 60 mm. Vortoil ® hydrocyclone unit by looking at FIGS. 13 and 14.

If the droplet size is less than 20 microns, then the combination of pump and hydrocyclone must be looked at simultaneously. For instance, the 60 mm. Vortoil ® hydrocyclone is not as effective at removing smaller droplets. But, the 60 mm. Vortoil ® hydrocyclone requires less differential head for the same throughput. One might be able to use a pump other than the progressive cavity pump with equal wall stator, if the differential head needed is lower than about 75 psi. Pumps such as the rotary vane and twin lobe pumps offer more compact arrangements and better maintenance schedules that the progressive cavity pumps.

Anxillary Equipment

Testing was also done to determine the effect of ancillary equipment such as valves and strainers which might normally be placed upstream of a pump.

Both butterfly and globe valves were tested using the droplet size analysis techniques described above, and were found to be equally detrimental to oil droplet size. At pressure drops of greater than 20 psi, there was very large damage to the mean droplet size. Accordingly, where at all possible the use of control valves upstream of the hydrocyclone should be minimized. This includes the elimination of typical recycle loops around the pump for maintaining flow rate control.

If recycle is necessary to control flow rates, the recycle fluid should be taken from the clean water discharge of the hydrocyclone, as shown in FIG. 1, rather than from the discharge in the pump.

Testing was also performed on a forty mesh strainer, and it was determined that little or no droplet shearing occurred at velocities through the screen of up to 230 feet per minute. Two sizes of strainers were tested, 80 and 40 mesh for their ability to remove particles which might plug the hydrocyclone reject orifice. The strainers were basket types sized for as much as 180% of normal flow area.

The strainers did in fact remove significant amounts of debris during testing. As indicated, there was no substantial degradational effect on the oil droplet size, and thus it appears that strainers can be used with a pump-hydrocyclone combination.

Thus it is seen that the apparatus and methods of the present invention readily achieve the ends and advantages mentioned as well as those inherent therein. While certain preferred embodiments of the invention have been illustrated and described for the purposes of the present disclosure, numerous changes in the arrangement and construction of parts and steps may be made by those skilled in the art which changes are encompassed within the scope and spirit of the appended claims.

What is claimed is:

1. A method of separating a dispersed phase liquid from a bulk phase liquid of a liquid-liquid mixture, said dispersed phase and bulk phase liquids having different densities, said method comprising the steps of:
    providing a supply of said liquid-liquid mixture at a first pressure;
    providing a pump means including means for minimizing degradation of the volumetric means size of droplets of the dispersed phase further including a pump size for maintaining said pump means at substantially near maximum flow rate capacity;
    pumping said liquid-liquid mixture with at least one pump means to a second pressure such that a differential between said first and second pressures is not substantially greater than a differential pressure at which said pump means begins to substantially degrade the volumetric mean size of droplets of said dispersed phase liquid passing therethrough, said pumping without substantial droplet degradation being achieved by operating said pump means at relatively near its maximum flowrate capacity to substantially reduce on a percentage basis the effect of fluid slippage within said pump means;
    directing said liquid-liquid mixture from said pump means to a hydrocyclone; and
    separating a substantial portion of said dispersed phase liquid from said liquid-liquid mixture in said hydrocyclone.

2. The method of claim 1, wherein:
    said first pressure is below and said second pressure is greater than or equal to a pressure required to drive said hydrocyclone, whereby the use of said pump means permits the substantial separation of liquid-liquid mixtures which otherwise are at too low a pressure to be substantially separated with said hydrocyclone.

3. The method of claim 1, wherein:
    said hydrocyclone has associated therewith a minimum input pressure necessary to drive said hydrocyclone and an optimum input pressure at which said hydrocyclone operates at maximum efficiency; and
    said first pressure of said liquid-liquid mixture is greater than said minimum pressure, whereby said pump means increases the efficiency of separation of said liquid-liquid mixture in said hydrocyclone by boosting the pressure of said liquid-liquid mixture closer to said optimum input pressure.

4. The method of claim 1, wherein:
    said hydrocyclone has an optimum input pressure associated therewith corresponding to a maximum operating efficiency of said hydrocyclone; and
    said second pressure of said liquid-liquid mixture discharged by said pump means is substantially equal to said optimum input pressure of said hydrocyclone.

5. The method of claim 1, further comprising a step of:
    monitoring a dispersed liquid droplet size distribution in an isokinetic sample of said liquid-liquid mixture to detect changes in said distribution.

6. The method of claim 5, wherein:
    said monitoring step is performed upstream of said pumping step.

7. The method of claim 1, wherein:
    said providing step is further characterized in that said supply of liquid-liquid mixture is provided from a primary separator requiring that a level of said mixture be maintained therein; and
    said method further comprises a step of recycling a portion of a clean bulk phase fluid outlet stream from said hydrocyclone to said primary separator to maintain said level of said mixture therein.

8. The method of claim 1, wherein:
    said pumping step is further characterized in that said pump means is a progressive cavity pump means having an equal wall stator.

9. The method of claim 1, wherein said liquid-liquid mixture is oily water, said dispersed phase liquid being primarily oil and said bulk phase liquid being primarily water.

10. The method of claim 9, wherein said oily water is provided from a separator of an oil well production system.

11. The method of claim 1, wherein said bulk phase liquid is primarily oil and said dispersed phase liquid is primarily water.

12. A method of separating oil from oily water, said method comprising steps of:
    providing a supply of oily water at a first pressure;
    providing a pump means including means for minimizing degradation of the volumetric mean size of droplets of oil further including a pump size for maintaining said pump means at substantially near maximum flow rate capacity;
    increasing the pressure of said oily water from said first pressure to a second pressure in a pump means while substantially minimizing oil droplet size degradation and maintaining an oil droplet size distribution capable of being efficiently separated in a hydrocyclone separator;
    directing said oily water from said pump means to said hydrocyclone separator; and
    separating said oil from said oily water in said hydrocyclone separator.

13. The method of claim 12, wherein:

said increasing step is further characterized in that said pump means is a relatively low slip pump means.

14. The method of claim 12, wherein:

said increasing step is further characterized in that said pump means is operated relatively near its maximum flow rate capacity thereby substantially minimizing on a percentage basis the effect of fluid slippage within said pump means.

15. The method of claim 12, wherein:

said first pressure is below and said second pressure is greater than or equal to a pressure required to drive said hydrocyclone separator, whereby the use of said pump means permits the substantial separation of oily water which otherwise is at too low a pressure to be substantially separated with said hydrocyclone separator.

16. The method of claim 12, wherein:

said hydrocyclone separator has associated therewith a minimum input pressure necessary to drive said hydrocyclone separator and an optimum input pressure at which said hydrocyclone separator operates at maximum efficiency; and said first pressure of said oily water is greater than said minimum pressure, whereby said pump means increases the efficiency of separation of said oily water in said hydrocyclone separator by boosting the pressure of said oily water closer to said optimum input pressure.

17. The method of claim 12, wherein:

said hydrocyclone separator has an optimum input pressure associated therewith corresponding to a maximum operating efficiency of said hydrocyclone separator; and said second pressure of said oily water discharged by said pump means is substantially equal to said optimum input pressure of said hydrocyclone separator.

18. The method of claim 12, wherein:

said providing step is further characterized in that said supply of oily water is provided from a primary separator of an oil well production system; and said method further includes a step of monitoring an oil droplet size distribution in said oily water between said primary separator and said pump means to detect changes in said distribution.

19. The method of claim 12, wherein:

said providing step is further characterized in that said supply of oily water is provided from a primary separator requiring that a level of said oily water be maintained therein; and said method further includes a step of recycling a portion of a clean water outlet stream from said hydrocyclone separator to said primary separator to maintain said level of oily water therein.

20. The method of claim 12, wherein:

said increasing step is further characterized in that said pump means is a progressive cavity pump means having an equal wall stator.

21. A method of separating oil from oily water, said method comprising the steps of:

providing a supply of oily water at a first pressure;

providing a pump means including means for minimizing degradation of the volumetric means size of droplets of the oil further including a pump size for maintaining said pump means at substantially near maximum flow rate capacity;

increasing the pressure of said oily water from said first pressure to a second pressure with a progressive cavity pump means having an equal-wall stator;

directing said oily water from said pump means to a hydrocyclone; and separating a substantial portion of the oil from said oily water in said hydrocyclone.

22. The method of claim 21, wherein:

said first pressure is below and said second pressure is greater than or equal to a pressure required to drive said hydrocyclone, whereby the use of said pump means permits the separation of oily water which otherwise is at too low a pressure to be separated with said hydrocyclone.

23. The method of claim 21, wherein:

said hydrocyclone has associated therewith a minimum input pressure necessary to drive said hydrocyclone and an optimum input pressure at which said hydrocyclone operates at maximum efficiency; and said first pressure of said oily water is greater than said minimum pressure, whereby said pump means increases the efficiency of separation of said oily water in said hydrocyclone by boosting the pressure of said oily water closer to said optimum input pressure.

24. The method of claim 21, wherein:

said hydrocyclone has an optimum input pressure associated therewith corresponding to a maximum operating efficiency of said hydrocyclone; and said second pressure of said oily water discharged by said progressive cavity pump means is substantially equal to said optimum input pressure of said hydrocyclone.

25. The method of claim 21, wherein oil droplet size degradation is substantially minimized in said pump means due to the very low fluid slippage permitted in the progressive cavity pump means having an equal wall stator.

26. The method of claim 21, wherein:

said providing step is further characterized in that said supply of oily water is provided from a primary separator of an oil well production system; and said method further includes a step of monitoring an oil droplet size distribution in said oily water between said primary separator and said pump means to detect changes in said distribution.

27. The method of claim 21, wherein:

said providing step is further characterized in that said supply of oily water is provided from a primary separator requiring that a level of said oily water be maintained therein; and said method further includes a step of recycling a portion of a clean water outlet stream from said hydrocyclone to said primary separator to maintain said level of oily water therein.

28. A liquid-liquid separation system comprising:

hydrocyclone means for separating a dispersed phase liquid from a bulk phase liquid of a liquid-liquid mixture, said hydrocyclone means having a minimum operating input flow rate; and pump means for pumping said mixture to said hydrocyclone means and for boosting said liquid mixture from a first pressure to a second pressure such that a differential between said first and second pressures is not substantially greater than a differential pressure at which said pump means begins to substantially degrade a volumetric mean size of droplets of said dispersed phase liquid passing therethrough, said pump means being sized to operate relatively near its maximum flow rate capacity when providing said minimum operating input flow rate to said hydrocyclone means and means for minimizing degradation of the volumetric mean size of droplets of the dispersed phase further including a pump size for maintaining said pump means at substantially near maximum flow rate capacity.

29. An oily water separation system, comprising:

a hydrocyclone means for separating oil from said oily water; and pump means for pumping said oily water to said hydrocyclone means and for increasing a pressure of said oily water from a first pressure to a second pressure while substantially minimizing oil droplet size degradation and maintaining an oil droplet size distribution capable of being efficiently separated in said hydrocyclone means for minimizing degradation of the volumetric mean size of droplets of oil, further including a pump size for maintaining said pump means at substantially near maximum flow rate capacity.

30. The system of claim 29, wherein:

said hydrocyclone means has a minimum operating input flow rate; and said pump means is a relatively low slip pump means sized to operate relatively near its maximum flow rate capacity when providing said minimum operating input flow rate to said hydrocyclone means.

31. An oily water separator system comprising:

hydrocyclone means for separating oil from oily water; and a progressive cavity pump means, having an equal wall stator, for boosting a pressure of said oily water supplied to said hydrocyclone means and for simultaneously avoiding degradation of oil droplet size below that which can be effectively separated by said hydrocyclone means;

and means for minimizing degradation of the volumetric mean size of droplets of the disperse phase further including a pump size for maintaining said pump means at substantially near maximum flow rate capacity.

* * * * *